(12) United States Patent
Ruotsalainen et al.

(10) Patent No.: US 7,230,993 B2
(45) Date of Patent: Jun. 12, 2007

(54) METHOD AND APPARATUS FOR MODULATION USING AN AT LEAST FOUR-DIMENSIONAL SIGNAL CONSTELLATION

(75) Inventors: Keijo Ruotsalainen, Oulu (FI); Markku Heikkilä, Oulu (FI)

(73) Assignee: Nokia Corporation, Espoo (FI)

( * ) Notice: Subject to any disclaimer, the term of this patent is extended or adjusted under 35 U.S.C. 154(b) by 779 days.

(21) Appl. No.: 10/092,358

(22) Filed: Mar. 6, 2002

(65) Prior Publication Data

US 2003/0169830 A1  Sep. 11, 2003

(51) Int. Cl.
*H04L 27/02* (2006.01)
*H02J 11/00* (2006.01)
*H03C 3/00* (2006.01)
*H03C 1/52* (2006.01)

(52) U.S. Cl. ............... 375/268; 375/271; 375/300; 375/302; 375/259; 370/206; 370/207; 370/482

(58) Field of Classification Search ............... None
See application file for complete search history.

(56) References Cited

U.S. PATENT DOCUMENTS

| 4,358,853 A | * | 11/1982 | Qureshi ............... 375/296 |
| 4,761,784 A | * | 8/1988 | Srinivasagopalan et al. ............... 714/795 |
| 5,105,442 A | * | 4/1992 | Wei ............... 375/262 |

OTHER PUBLICATIONS

Hai Geun Kim, "4-Dimensional Modulation for a bandlimited channel using QA2PSK" 1999 IEEE Wireless Communications and Networking Conference, Sep. 21-24, 1999, vol. 3, pp. 1144-1147.*

Boutros et al, "Signal Space Diversity: A Power and Bandwith Efficient Diversity Technique for the Rayleigh Fading Channel", Jul. 1998, IEEE Transactions on Information Theory, vol. 44, No. 4.*

Rappaport, Theodore S., Wireless Communication, Copyright 2002,1996, Prentice Hall PTR, Second Edition, pp. 325-328.*

Boutros et al, "Signal Space Diversity: A Power and Bandwidth Efficient Diversity Technique for the Rayleigh Fading Channel", Jul. 1998, IEEE Transactions on Information Theory, vol. 44, No. 4.*

Langton, Charan, "All About Modulation", Copyright 2002, www.complextoreal.com, pp. 1,40-42,48.*

*Nonlinear Rotationally Invariant Trellis Codes for Multidimensional Modulation*; Tingfang Ji, Ping An, Member, IEEE, and Subhash C. Kwatra, Senior Member, IEEE; IEEE Transactions on Communications, vol. 45, No. 10; Oct. 1997.

*Applicability of four-dimensional modulations to digital satellites: A simulation study*; Giorgio Taricco, Ezio, Biglieri, Valentino Castellani, Dipartimento di Elettronica, Politecnico, Corsa Duca degli Abruzzi 24, 1-10129 Torino, Italy; p. 28-32.

*Multidimensional Constellations-Part I: Introduction, Figures of Merit, and Generalized Cross Constellations*; G. David Forney, Jr., Fellow, IEEE, and Lee-Fang Wei; IEEE Journal on Selected Areas in Communications, vol. 7, No. 6; Aug. 1989. p. 877-892.

* cited by examiner

*Primary Examiner*—Kevin Kim
*Assistant Examiner*—Linda Wong
(74) *Attorney, Agent, or Firm*—Ware, Fressola, Van Der Sluys & Adolphson LLP

(57) ABSTRACT

A digital communication system (20) in which a signal constellation (30) of a dimensionality of at least four is used, with distance properties chosen to reduce the bit error rate compared to that of digital communication systems using signal constellations of half the dimensionality. A symbol generator (21) uses the higher dimensional signal constellation (30), or any orthogonal transformation of the higher dimensional signal constellation (30), to translate a bit stream into a stream of higher dimensional symbols, which it then provides to a modulator (22). The modulator (22) transmits each higher dimensional symbol in at least two parts, using a modulation scheme according to the prior art, such as QAM or QPSK.

2 Claims, 2 Drawing Sheets

| k | $x_1^{(k)}$ | $x_2^{(k)}$ | $x_3^{(k)}$ | $x_4^{(k)}$ |
|---|---|---|---|---|
| 0 | $\frac{1}{ab}R$ | $\frac{1}{ab}R$ | $\frac{1}{a^2b}R$ | $\frac{1}{a^2b}R$ |
| 1 | $-\frac{1}{ab}R$ | $\frac{1}{ab}R$ | $\frac{1}{a^2b}R$ | $\frac{1}{a^2b}R$ |
| 2 | $-\frac{1}{ab}R$ | $-\frac{1}{ab}R$ | $\frac{1}{a^2b}R$ | $\frac{1}{a^2b}R$ |
| 3 | $\frac{1}{ab}R$ | $-\frac{1}{ab}R$ | $\frac{1}{a^2b}R$ | $\frac{1}{a^2b}R$ |
| 4 | $\frac{a}{b}R$ | 0 | $-\frac{1}{a^2b}R$ | $\frac{1}{a^2b}R$ |
| 5 | 0 | $\frac{a}{b}R$ | $-\frac{1}{a^2b}R$ | $\frac{1}{a^2b}R$ |
| 6 | $-\frac{a}{b}R$ | 0 | $-\frac{1}{a^2b}R$ | $\frac{1}{a^2b}R$ |
| 7 | 0 | $-\frac{a}{b}R$ | $-\frac{1}{a^2b}R$ | $\frac{1}{a^2b}R$ |
| 8 | 0 | $\frac{a}{b}R$ | $\frac{1}{a^2b}R$ | $-\frac{1}{a^2b}R$ |
| 9 | $-\frac{a}{b}R$ | 0 | $\frac{1}{a^2b}R$ | $-\frac{1}{a^2b}R$ |
| 10 | 0 | $-\frac{a}{b}R$ | $\frac{1}{a^2b}R$ | $-\frac{1}{a^2b}R$ |
| 11 | $\frac{a}{b}R$ | 0 | $\frac{1}{a^2b}R$ | $-\frac{1}{a^2b}R$ |
| 12 | $\frac{1}{ab}R$ | $\frac{1}{ab}R$ | $-\frac{1}{a^2b}R$ | $-\frac{1}{a^2b}R$ |
| 13 | $-\frac{1}{ab}R$ | $\frac{1}{ab}R$ | $-\frac{1}{a^2b}R$ | $-\frac{1}{a^2b}R$ |
| 14 | $-\frac{1}{ab}R$ | $-\frac{1}{ab}R$ | $-\frac{1}{a^2b}R$ | $-\frac{1}{a^2b}R$ |
| 15 | $\frac{1}{ab}R$ | $-\frac{1}{ab}R$ | $-\frac{1}{a^2b}R$ | $-\frac{1}{a^2b}R$ |

Fig. 3

METHOD AND APPARATUS FOR MODULATION USING AN AT LEAST FOUR-DIMENSIONAL SIGNAL CONSTELLATION

TECHNICAL FIELD

The present invention is related to the communication of digital information, and more particularly to signal constellations used by digital communications systems to encode groups of bits as symbols.

BACKGROUND ART

According to the prior art, in a digital communication system, sets of consecutive bits in a bit stream are mapped to symbols, sometimes considered to be complex symbols having a real part and an imaginary part, with the real part used to modulate an in-phase carrier signal and the imaginary part used to modulate a quadrature-phase carrier signal. The data rate of such a digital communication system depends on, among other factors, the number of bits represented by each symbol. The bit error rate, depends on, among other factors, the distance, in an abstract mathematical sense, between any two points in the set of symbols used to represent/encode the bit stream. The set of symbols can be indicated as a so-called signal constellation (or symbol constellation), which is a representation showing how the correspondence between each symbol and a respective sequence of bits, the representation sometimes being provided as a plot of the symbols as points in a usually two-dimensional space. An example of a signal constellation is shown in FIG. 1A for quadrature phase shift keying (QPSK) modulation, the signal constellation there showing that the bit sequence 00 is mapped to the symbol $\sqrt{P}+0j$, the bit sequence 01 is mapped to the symbol $0+j\sqrt{P}$, and so on, where P is the power used by the digital communication system in transmitting one symbol.

As mentioned above, the bit error rate of a digital communication system depends on the distance properties of the signal constellation being used. In the case of QPSK, using as a measure of distance the Euclidean between points in the abstract signal constellation space, the minimum distance between any two points in the signal constellation is, as can be seen from FIG. 1A, $$D = \sqrt{2P},$$

where, as mentioned above, P is the signal power used to transmit one symbol, i.e. the power used during one symbol period.

Another representation of the QPSK signal constellation for QPSK modulation, a representation equivalent to the representation shown in FIG. 1A, is shown in FIG. 1B. The FIG. 1B representation indicates that for the bit string corresponding to k=3 (i.e. for the bit sequence 11), the QPSK symbol is $-R+0j$ (where R=P, as indicated in FIG. 1A).

To increase the bit rate it is possible to use so-called MSK modulation with M>4. For example, 8PSK modulation transmits 3 bits per symbol. Such approaches to improving system performance by improving the bit rate also use two-dimensional signal constellations, like QPSK modulation, but because the signal constellation space is more densely packed than for systems encoding fewer bits per symbol, the smallest distance between any two points for MSK signal constellations (with M>4) is smaller, and so the bit error rate worsens.

Another approach has been to use higher-dimensional signal constellations. The prior art teaches using signal points carved from a higher dimensional lattice/trellis code. However, the distance properties for such constellations are not optimal, and an implementation of systems using such signal constellations can be complicated.

What is needed is a higher-dimensional signal constellation not based on lattice/trellis codes, and ideally one with distance properties that are superior to those of signal constellations carved from such codes.

DISCLOSURE OF THE INVENTION

Accordingly, in a first aspect of the invention, a digital communication system is provided having a symbol generator and a modulator, the symbol generator for translating a bit stream into a symbol stream based on a predetermined signal constellation, each symbol in the symbol stream representing a predetermined even number of consecutive bits in the bit stream, the modulator using a predetermined modulation scheme to modulate a carrier signal with the symbol stream so as to provide a modulated carrier signal, characterized in that the signal constellation has a dimensionality that is at least four and is an integral multiple of two, and that each symbol of the signal constellation corresponds to an ordered set of at least two sets of two or more numbers, and further characterized in that for each of the at least four-dimensional symbols, the modulator modulates the carrier signal using in turn each of the at least two corresponding sets of two or more numbers.

In accord with the first aspect of the invention, each symbol of the signal constellation may be located in the signal constellation so as to be separated from any other symbol by at least a distance of $a^5 P^{1/2}/b$, where $a=2^{1/4}$ and $b=(1+2^{1/2})^{1/2}$ and P is the power radiated in transmitting one symbol.

In a second aspect of the invention, a method is provided by which a digital communication system transmits a bit stream, the digital communication system having a symbol generator and a modulator, the symbol generator for translating the bit stream into a symbol stream based on a predetermined signal constellation, each symbol in the symbol stream representing a predetermined even number of consecutive bits in the bit stream, the modulator using a predetermined modulation scheme to modulate a carrier signal with the symbol stream so as to provide a modulated carrier signal, characterized in that the signal constellation has a dimensionality that is at least four and is an integral multiple of two, and that each symbol of the signal constellation corresponds to an ordered set of at least two sets of two or more numbers, and further characterized in that for each of the at least four-dimensional symbols, the modulator modulates the carrier signal using in turn each of the at least two corresponding sets of two or more numbers.

In accord with the second aspect of the invention, each symbol of the signal constellation may be located in the signal constellation so as to be separated from any other symbol by at least a distance of $a^5 P^{1/2}/b$, where $a=2^{1/4}$ and $b=(1+2^{1/2})^{1/2}$ and P is the power radiated in transmitting one symbol.

BRIEF DESCRIPTION OF THE DRAWINGS

The above and other objects, features and advantages of the invention will become apparent from a consideration of the subsequent detailed description presented in connection with accompanying drawings, in which:

FIG. 3 is a representation of the four-dimensional signal constellation used in the digital communication for which some elements are shown in FIG. 2.

BEST MODE FOR CARRYING OUT THE INVENTION

The invention is described below for an application in which a four-dimensional signal constellation is used. It should be understood, however, that the invention encompasses higher-dimensional signal constellations as well, such as for example a six-dimensional signal constellation or any other higher, even-dimensional constellation. Further, although the invention is described for a particular four-dimensional signal constellation, any orthogonal transformation (i.e. rotation) of the signal constellation is also encompassed by the invention.

An approach that can be used to determine a (d+1)-dimensional spherical signal constellation is as follows. (Although we always want to end up with an even-dimensional constellation, the construction proceeds inductively, and as a by-product we generate also odd-dimensional constellations.) Begin with a d-dimensional signal constellation, which will contain $2^d$ points. Then generate a (d+1) dimensional spherical signal constellation, with $2^{d+1}$-points on the (d+1)-dimensional sphere, by constructing the constellation that is the union of the two disjoint sets A and B, where B is the image of A under isometric transformation UP, i.e. B=UP(A), in which P is the reflection with respect to the plane $x_{d+1}=0$, and U is an orthogonal transformation operating only on the coordinates $(x_1, \ldots, x_d)$. The set A is the optimal constellation on the d-dimensional sphere, which is now a subset of the d+1-dimensional sphere. This d-dimensional sphere is an intersection of the d+1-dimensional sphere and the plane $x_{d+1}=+h$. The sets A and B are discrete sets on the surface of a d+1-dimensional sphere, i.e. on the surfaces/planes $x_{d+1}=+h$ and $x_{d+1}=-h$, respectively. The intersection of the planes $x_{d+1}=\pm h$ and the (d+1)-dimensional sphere is a d-dimensional sphere with radius $\sqrt{R^2-h^2}$. So the sets A and B are eventually on the d-dimensional sphere. Next take for A (and hence for B) the optimal d-dimensional constellation. What remains are some free parameters h and the elements of the transformation U. These have to be determined in such a manner that the minimum distance between the points is maximized. As described above, in the invention this scheme is carried out explicitly for a 4-dimensional constellation.

Figures 1A, 1B:
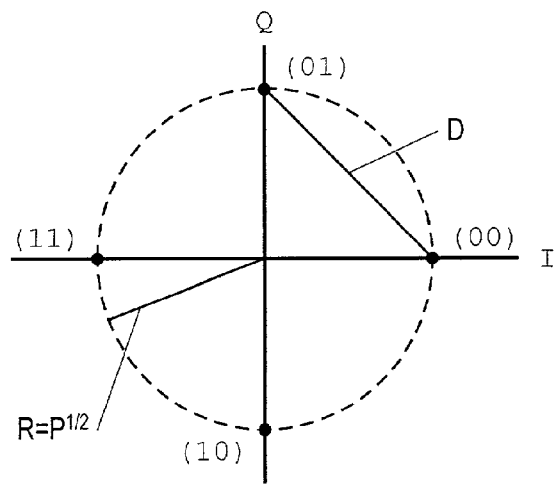
FIG. 1A is the signal constellation for QPSK modulation.
FIG. 1B is another representation of the signal constellation for QPSK modulation.
Figure 2:
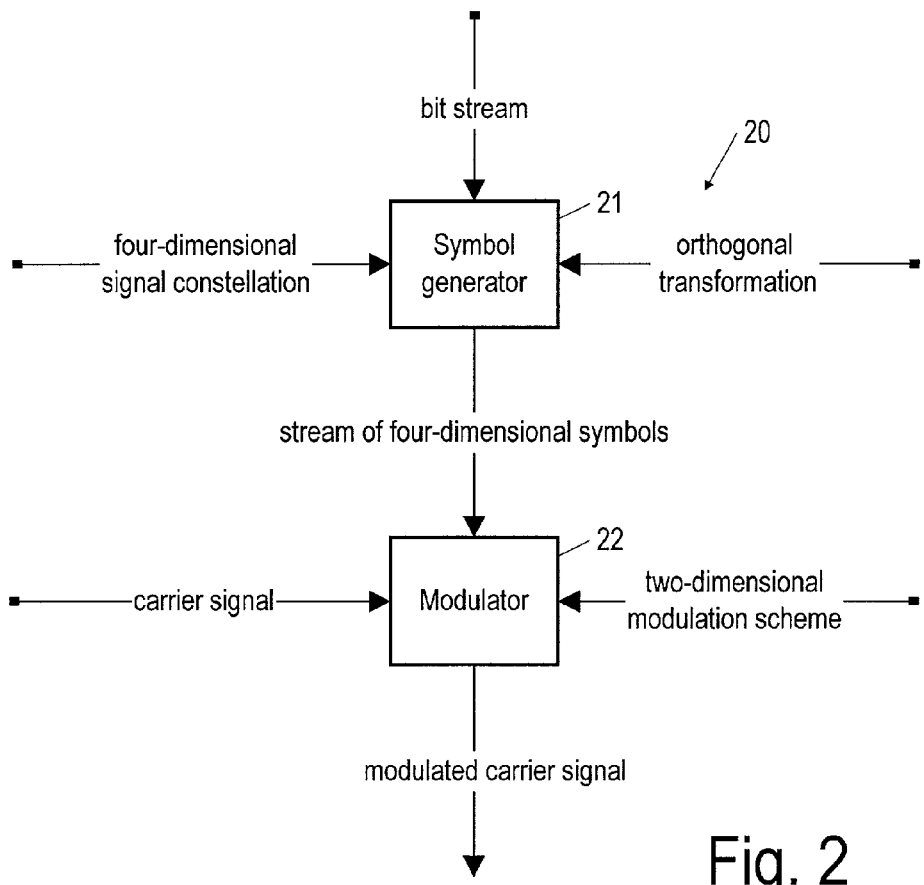
FIG. 2 is a block diagram/flow diagram of components of a digital communication system according to the present invention, showing the use of a four-dimensional signal constellation.

Referring now to FIGS. 2 and 3, a digital communication system 20 according to the invention is shown as including a symbol generator 21 for translating a bit stream into a symbol stream, i.e. into a stream of symbols, in which each symbol represents four bits, the translation being performed in accord with a predetermined signal constellation 30 (FIG. 3). For example, bit sequence 0110, which in decimal is the value k=6, corresponds to the four-dimensional symbol having coordinates $(x_1, x_2, x_3, x_4)=(-aR/b, 0, -R/a^2b, +R/a^2b)$ where $a=2^{1/4}$, $b=(1+2^{1/2})^{1/2}$ and $R=(2P)^{1/2}$, in which 2P is the power radiated in transmitting one four-dimensional symbol.

Now referring only to FIG. 2, the invention also includes a modulator 22 that uses the symbol stream provided by the symbol generator 21 to modulate a carrier signal according to a predetermined two-dimensional modulation scheme, such as quadrature amplitude modulation (QAM), so as to provide a modulated carrier signal, and does so by modulating the carrier with each symbol in two steps, a first step in which the first two coordinates $x_1 x_2$ of the four-dimensional symbol are used to modulate the carrier according to the predetermined two-dimensional modulation scheme, and a second step in which the next two coordinates $x_3 x_4$ are used to modulate the carrier signal according to the same two-dimensional modulation scheme. For example, for an implementation using QAM, the first two coordinates $x_1 x_2$ are taken to correspond to a first complex number $x_1+jx_2$, or more generally and equivalently, to a first pair of numbers $(x_1, x_2)$, which is then used as the input to a QAM modulator, and the next two coordinates $x_3 x_4$ are taken to correspond to a second complex number $x_3+jx_4$, or more generally and equivalently, to a second pair of numbers $(x_3, x_4)$, which is then used as the input to the same QAM modulator. For an implementation using QPSK, the same correspondences would be made, but a QPSK modulator would be used. The same idea for transmission could be used for 16 QAM (four bits per symbol), i.e. one could have an eight-dimensional signal constellation, and transmit each symbol in two parts using 16 QAM for each part. Or one could transmit each symbol of an eight-dimensional signal constellation in four parts, using QAM (or, equivalently, 4 QAM) or QPSK for each part. (Note that the notation QAM is used here to indicate a modulation scheme encoding two bits per symbol, and so providing 4 symbols. The notation KQAM is used to indicate a modulation scheme encoding $\log_2(K)$ bits per symbol, and so providing K symbols. Thus, according to the notation here, QAM is equivalent to 4 QAM.)

Additionally, instead of using two modulators for each of which a symbol represents 2 bits, such as QAM modulators, one could use two modulators in each of which each symbol represents 3 bits, such as 8 QPSK modulators or 8 QAM modulators. Thus, two sets of three numbers would be transmitted instead of two sets of two numbers, as in QAM or 4 PSK. Referring back to FIG. 3, it can be seen that the smallest distance between any two symbols in the signal constellation 30 of the invention is $a^5b^{-1}P^{1/2}$, compared to $a^2P^{1/2}$ for QPSK.

Thus, in the present invention, a four-dimensional symbol is transmitted in two parts (and a six-dimensional symbol would be transmitted in three parts, and so on, or an eight-dimensional symbol could be transmitted in two parts using a modulation scheme that transmits four bits per symbol, and so on) but because the distance properties of the four-dimensional signal constellation are improved over those of the two-dimensional signal constellation used in the two-dimensional modulation scheme according to the prior art, the bit error rate is improved by the present invention (although the bit rate is unchanged from what it is in the prior art).

SCOPE OF THE INVENTION

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A digital communication system comprising:
a symbol generator and a modulator, the symbol generator for translating a bit stream into a symbol stream based on a predetermined signal constellation, each symbol in the symbol stream for representing a predetermined even number of consecutive bits in the bit stream, the modulator configured to use a predetermined modulation scheme to modulate a carrier signal with the symbol stream so as to provide a modulated carrier signal, wherein the signal constellation has a dimensionality that is at least four and is a multiple of two, and each symbol of the signal constellation corresponds to an ordered set of at least two sets of two or more numbers, and further wherein for each of the at least four-dimensional symbols, the modulator is configured to modulate the carrier signal using in turn each of the at least two corresponding sets of two or more numbers, and wherein each symbol of the signal constellation is located in the signal constellation so as to be separated from any other symbol by at least a distance of $a^5 P^{1/2}/b$, where $a=2^{1/4}$ and $b=(1+2^{1/2})^{1/2}$ and P is the power radiated in transmitting one symbol.

2. A method by which a digital communication system (20) transmits a bit stream, comprising:

a symbol generator translating a bit stream into a symbol stream based on a predetermined signal constellation, wherein each symbol in the symbol stream representing a predetermined even number of consecutive bits in the bit stream, and a modulator using a predetermined modulation scheme to modulate a carrier signal with the symbol stream so as to provide a modulated carrier signal, wherein the signal constellation has a dimensionality that is at least four and is a multiple of two, and each symbol of the signal constellation corresponds to an ordered set of at least two sets of two or more numbers, and further wherein for each of the at least four-dimensional symbols, the modulator modulates the carrier signal using in turn each of the at least two corresponding sets of two or more numbers, and wherein each symbol of the signal constellation is located in the signal constellation so as to be separated from any other symbol by at least a distance of $a^5 P^{1/2}/b$, where $a=2^{1/4}$ and $b=(1+2^{1/2})^{1/2}$ and P is the power radiated in transmitting one symbol.

* * * * *

UNITED STATES PATENT AND TRADEMARK OFFICE
CERTIFICATE OF CORRECTION

| | |
|---|---|
| PATENT NO. | : 7,230,993 B2 |
| APPLICATION NO. | : 10/092358 |
| DATED | : June 12, 2007 |
| INVENTOR(S) | : K. Ruotsalainen et al. |

It is certified that error appears in the above-identified patent and that said Letters Patent is hereby corrected as shown below:

Title Page;

1. On cover sheet, under "References Cited," please add the following foreign reference:

--EP 0 485 105 A2 to Victor Bernard Lawrence, published May 13, 1992.--

Signed and Sealed this

Twenty-seventh Day of November, 2007

JON W. DUDAS
*Director of the United States Patent and Trademark Office*